INVENTORS
PAUL VAN ACKEREN
FRANZ DOLL
BY
Thomas J. P. O'Brien
their ATTORNEY

INVENTORS.
PAUL VAN ACKEREN
FRANZ DOLL
BY Thomas J. P. O'Brien
their ATTORNEY

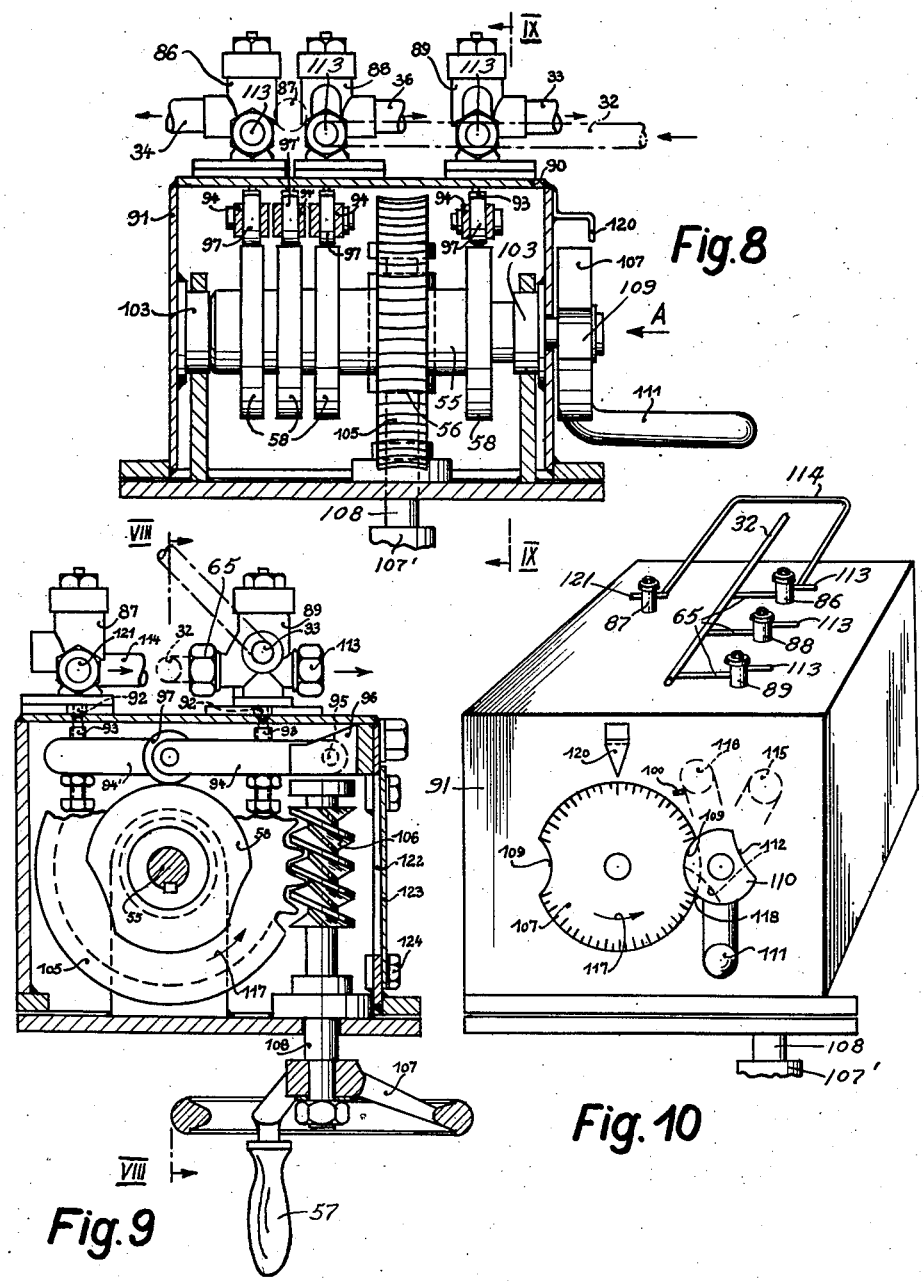

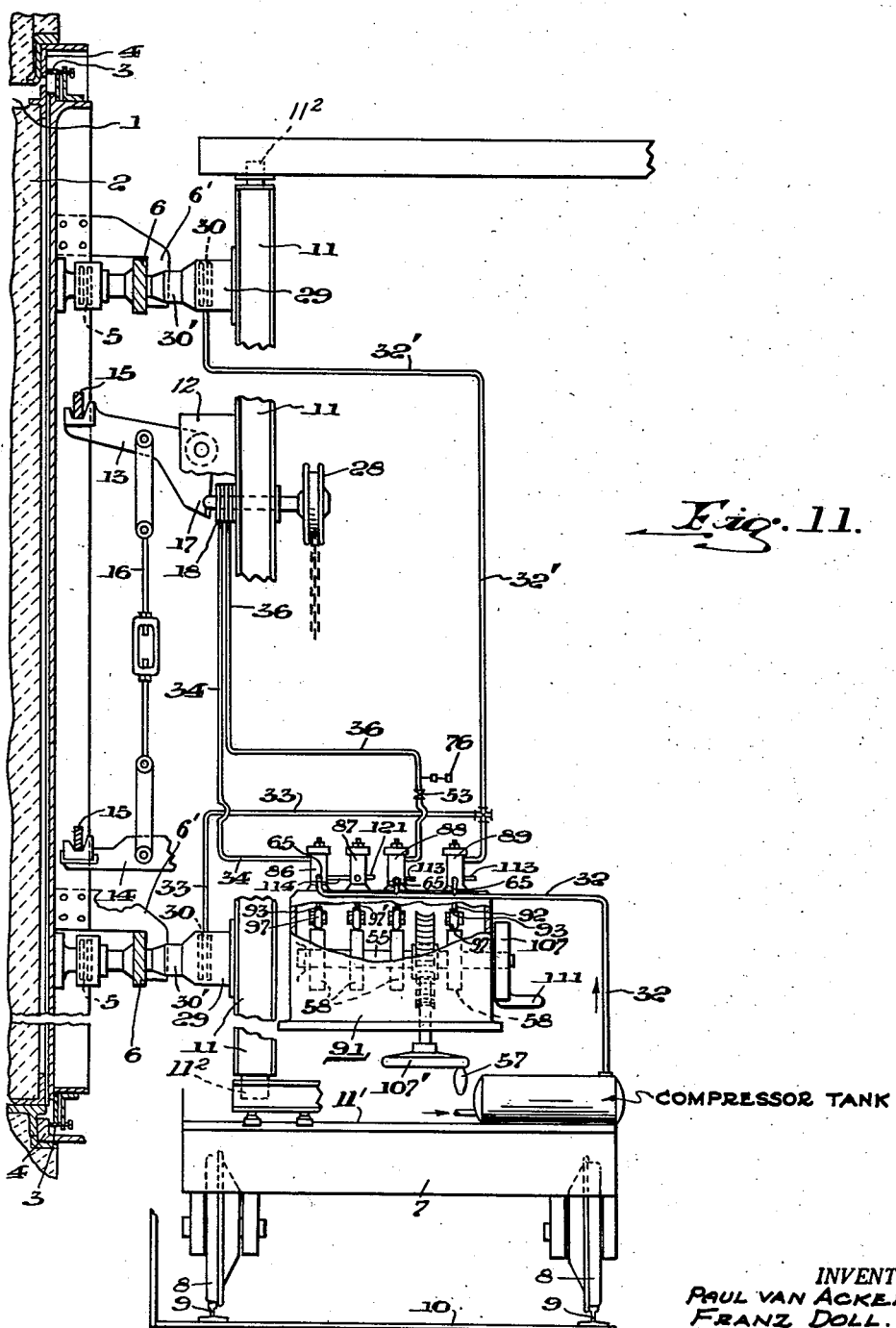

2,796,995
DOOR LIFTING MEANS FOR HORIZONTAL COKING CHAMBER OVENS

Paul Van Ackeren and Franz Doll, Essen, Germany, assignors, by mesne assignments, to Koppers Company, Inc., Pittsburgh, Pa., a corporation of Delaware Application August 7, 1952, Serial No. 303,116

9 Claims. (Cl. 212—4)

The present invention is concerned with a door lifting means for horizontal coking chamber ovens, by means of which the door can be grasped, unlatched, and then lifted or raised slightly for clearance after it has been unlatched to be withdrawn and be moved or pivoted aside.

The lifting of the door which is required to effect clearance from its door frame before it is withdrawn from the oven chamber opening, is small and has usually been carried out by hand using a crank as by a drive from an electric motor or by pressure means which are pneumatically- or hydraulically-operated. The hand raising or clearing procedure is a comparatively slow operation, whilst expensive means are required for its accomplishment by electric motor drive, whereas the fluid pressure-operated means has the advantage that the movement of lifting the door is performed in a very short time without the need for any variable-ratio gear.

The present invention resides in the latter type arrangement of fluid pressure medium conduits serving means operable by pneumatic or compressible hydraulic pressure and so interconnected through a sequence control device that the closure latches can first be released and the grasped door thereupon raised.

The invention is of particular importance and virtue with spring latched doors which are released by first compressing the springs to some extent to free the latches, since the procedure for lifting the door is considerably simplified, and the ready swinging of the latches from their hooks, assisted by fluid-pressure-operated means, requires no difficult and time-consuming manual operation when the door is to be withdrawn.

Further features of the invention reside in the sequence control of the fluid pressure conduits to pressure devices or motors to apply pressure fluid first to the thrust producing means or thrust motor of the door lifting means, and then, to said pressure devices for the springs, with a simultaneous cut-off of the pressure fluid flow to said thrust motor for the door lifting means.

This sequence control results in pressure fluid being supplied first to bring the door lifting claws into a mere grasping engagement with the door lugs, initially incapable of producing an upward movement of the door because the latches are still engaged under their full closure pressure, the door being lifted later by the pressure previously introduced for the lifting claws, which pressure continues to act on the door-lifting claws, and begins to lift the door upon the commencement of the relaxation of the closure pressure on the latches under the later applied force of the fluid pressure.

This raising or clearance of the door is, however, limited by the sequence control device cutting off the further supply of such pressure medium to the door-lifting claws when it supplies pressure to the pressure devices for the latching. The compressed air conveniently used as the pressure medium previously entrapped in the thrust motor for the lifting hooks, expands the same during the release of the latches to an extent sufficient to produce the mere short lifting of the door for its clearance.

The clearance of the door causes the door seal to slide up over the sealing surface of the door frame against which the door seal is normally applied, at the commencement of the door lift and under a substantial pressure, thereby cleaning the sealing surface of tarry deposits, more particularly in the zone of the foot and head of the door opening.

The positive supply and arrest of the fluid pressure medium to the thrust motor for the lifting hooks results in the door lifting claws first of all graspably engaging the door lugs on the door at a pressure of say 20 atmospheres, but the door does not lift to clear as it is still latched under pressure, and it is only when the sequence control device is further operated that the pressure of the springs on the latches is relaxed, and thus the spring pressure by which the sealing means of the door are applied against the sealing surface on the door frame, are relaxed, that the door is raised a predetermined amount by the action of its thrust motor, which remains under pressure but is cut off from further supply of pressure medium, so that after the performance of this work a pressure of about 15 atmospheres remains in the thrust motor for the lifting hooks.

As a further feature, a retracting motor is coaxially coupled to the thrust motor for the door-lifting means for reseating the door when reinserted into its doorway, whereby the lifting means descends to the position it occupied before the raising of the door but the grasping engagement with the door is maintained, whereupon the latches may be pivoted behind their hooks, the pressure fluid supply to all the mechanisms shut off by the sequence control device, the mechanisms exhausted of fluid pressure, so that the closure springs establish the closure pressure on the latches and the door-lifting claws move away from the door lugs under their own weight by gravity, whereupon the door lifting means are withdrawn.

Compressed air supplied to the retracting motor in this way results in the avoidance of an excessive friction of the door sealing means on the sealing surface of the door frame since it exerts an opposite force on the door after the after-expansion which effected the raising of the door, and which after expansion can only take place after the closure springs have been compressed, or during this action, or after the retracting thrust motor is exhausted of air.

The sequence control device may advantageously be of the type having a common drive shaft having cam discs thereon which are adapted by their sequence arrangement on the shaft to operate slides or valves controlling the compressed air supply and the exhaustion of the air to fluid pressure lines leading to said motors.

The supply of compressed air to the retracting motor can be augmented through a special conduit, in case the door-lifting claws are unable to drop completely free of the lifting lugs.

To positively avoid any likelihood of the door-lifting claws or the thrust motor connected thereto jamming, when the lifting claws are to drop down, a valve is also provided to delay the relief of the pressure, in the conduit through which the pressure fluid flows to the retracting motor. This insures, in the last position of the sequence control device for exhaustion of the thrust and retracting motors, that the air escapes rapidly from the thrust motor but in retarded fashion from the retracting motor. As a consequence the retracting motor, in remaining under a certain degree of pressure which only slowly disperses, withdraws the door-lifting claws positively into their starting positions.

Additional features are: means for precluding premature withdrawal of the door-lifting means, when the claws are engaged with their lugs but the door is still latched, this conveniently comprising the provision of an overload protective device in the fluid supply circuit of the line of one of the motors for the door-lifting claws, A safety device mechanism that moves to and from the oven chambers, and from oven to oven, which device prevents travel of this mechanism so long as the operations for inserting the door are uncompleted. For this purpose a switch is provided, for operation by the supply conduit of the retracting motor, which performs the final movement, which switch is controlled by the compressed air in said conduit line and which is adapted to interrupt the current supply to the driving motor or motors for movement of the door-operating mechanism and from the oven chamber and from oven to oven so long as this retracting motor remains under compression.

The various fluid pressure-operated mechanism preferably each comprise an envelope of expansible material, for example Buna, rubber or the like, or an expansible bellows, but these mechanisms can, however, consist of piston motors, and the thrust and retracting motors of the door mechanism can, in this event, be constructed as a double-piston motor.

Preferred embodiments of the invention are illustrated in the accompanying drawings, in which:

Figure 1 is a vertical section through an oven chamber door inserted in its oven doorway, and an elevational view of a door-lifting means according to this invention disposed in front of this door.

Figures 2, 3, and 4 are similar horizontal sections, on an enlarged scale, of fluid pressure-operated means of this invention, all being on the line II—II in Figure 1 and representing such means in the different phases of its fluid pressure application thereto.

Figure 5 is a diagrammatic illustration of a sequence control device employed in one embodiment of the invention to control the operation of said fluid pressure operated means in the lifting and insertion of a door.

Figure 6 consists of a series of diagrammatic illustrations of parts of the sequence control mechanism or device in its various operating stages.

Figure 8 is a vertical longitudinal section along the line VIII—VIII of Figure 9 to illustrate another and the preferred embodiment of the sequence control device.

Figure 9 is a section on the line IX—IX of Figure 8.

Figure 10 is a side view of the same device as seen in the direction of arrow A in Figure 8.

Figure 11 is a diagrammatic view illustrating the fluid system.

Figure 1:
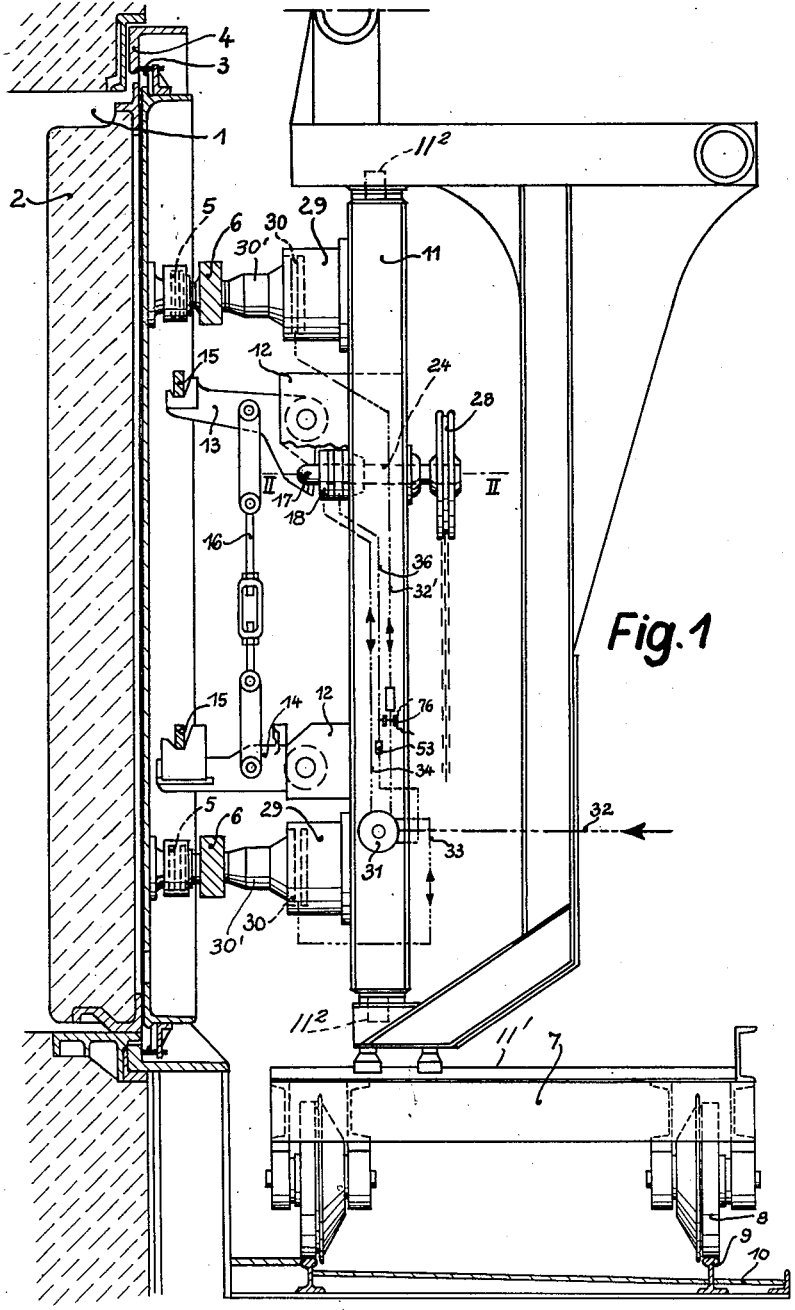

Referring to Figure 1 of the drawings, the door 2 is shown in the closed condition in an oven chamber 1, with a sealing flange 3 on the door then being pressed against the sealing surface of the door frame 4 under the pressure of closure springs 5 arranged in housings at the upper and lower parts of the door. The closure springs 5 transmit this pressure to the door 2 and to closure latches 6 whose arms engage behind hooks 6' secured to the body of the oven.

The door-lifting means forming part of the door-operating mechanism 7, 11, which may be connected to the conventional coke guide car or like means movable from chamber to chamber on the coke side of the oven or with the pusher means likewise movable alongside the oven battery on the pusher machine side, is arranged to be propelled in the axial direction of the oven while on a traveling frame 7, which runs along the oven battery from chamber to chamber 1 on rails 9 on the operating platform 10 by means of wheels 8.

The door-lifting means comprises claws 13 and 14 pivotally mounted in bearings 12 on a vertical girder 11 pivoted at 11² and forming part of the door-operating mechanism movable axially toward and away from chambers 1 on track 11'. The door-lifting claws 13 and 14 are formed at their ends with jaws to engage lugs 15 on the door, and are interconnected by a link system 16 so that they pivot in unison. The upper door-lifting claw 13 is of angled formation, the downwardly projecting limb 17 thereof being located adjacent a pressure-exerting fluid pressure operated thrust motor 18 and articulated to the latter as shown at 13, Figs. 2 to 4.

Figure 2:
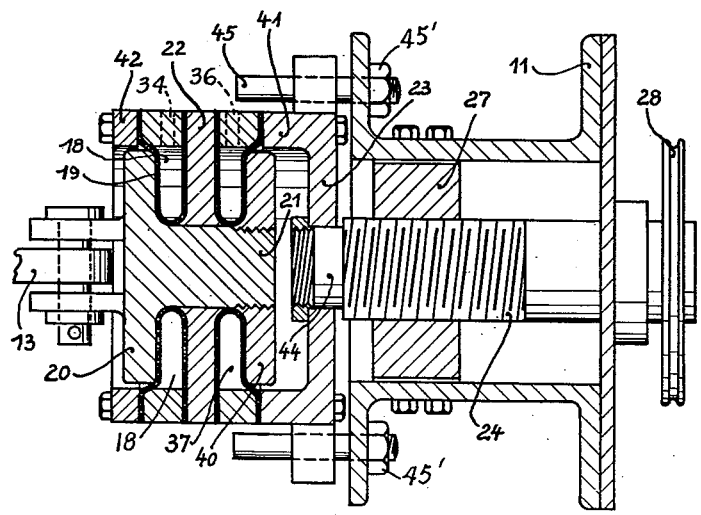

As will be seen from Figure 2, the motor 18 is composed of a bellow 19 of expansible material, for instance, Buna, which is located between a collar 20 of a movable shaft 21, mounted for axial displacement, and one side of a ring 22 which is movable along this shaft. Applied against the other side of the ring 22 is a further bellow 19, also composed of expansible material, forming a further fluid pressure-operated motor 37, the "retracting" motor, for which the compression ring 40 screw-threaded on the shaft 21 forms a limiting stop. An annular housing body 23 having the ring 22 fastened therein intermediate an outer ring part 42 and an inner cylindrical ring part 41, is loosely rotatably mounted on a spindle 24. Both bellows 19 are formed as an envelope which is applied annularly around the shaft 21, these bellows respectively being fluid-tightly clamped externally by means of an annular metallic ring between outer ring 42 and the ring 22, and by a second ring between ring 22 and the inner ring 41.

The spindle 24 has a screw thread mating with a nut 27 which is secured to the vertical girder 11 such that the two motors 18, 37 can be axially adjusted for regulation by hand or chain wheel 28, arranged externally on the spindle 24, to compensate for substantial differences in level between the door and the operating mechanism, due for instance to the ground sinking.

This adjustment is effected by axial displacement of the body 23 which is rotatably mounted loosely in an annular groove 44 of the spindle 24 but is held against rotation and is allowed to undergo axial displacement by virtue of a screw 45, threaded through a nut 45' secured to the girder 11, and extending into the path of rotation of the housing 23 of the operating mechanism. Thus, even if the fluid pressure means of the system should break down, the door can be lifted by hand operation of the motors 18, 17 with the aid of this spindle 24.

Fluid pressure-operated pressure-exerting devices 30 for the latch bars 6 are mounted in bearings 29 connected to the vertical girder 11 in the vicinity of the upper and lower latches 6 on the door, for compressing the closure springs in the corresponding housings 5 when the door 2 is to be unlatched.

Arranged as in Fig. 1, at the lower part of the door-lifting means, on the girder 11, is a sequence drive control device 31, which in the first embodiment of the invention, is capable of being adjusted into any one of four positions hereinafter referred to as positions I to IV. Compressed air from a source 32 is passed by the operation of the device 31 (Figs. 1, 5 to 9) through pipes 32' and 33 to the upper and lower pressure devices 30 for the latches 15, and through a pipe 34 to the thrust-motor 18, and through a pipe 36 to the retracting motor 37 for the lifting claws 13, 14.

The door is raised from an oven doorway in the following fashion:

After the carriage 7 for the door-lifting means 11 has been propelled from oven to oven to a position, in front of the door 2 concerned, and carriage 11 advanced to a spot in which the door-lifting claws 13, 14 are located beneath the lugs 15 ready for engagement with the latter, and the pressure devices 30 and their couplings 30' are situated directly in front of the closure latches 6 for the purpose of compressing the closure springs 5, the sequence control device 31 is adjusted to position I (Fig. 6), i. e., the pressure devices 30 for the latches 6 are both relieved of pressure.

Thereupon compressed air from line 32, for example at a pressure of 20 atmospheres, is applied to the thrust motor 18, as in Fig. 2, of the door-lifting means by adjusting the sequence control device 31, to position II for the lifting operation. As a result, the bellows 19 expands, Fig. 3, against collar 22 and moves motor 18, which exerts a push on the limb 17 of the upper door-lifting claw 13 so that the two claws 13 and 14 are applied against the respective lugs 15 under that fluid pressure in 18, which is required to support the dead weight of the door 2 plus the amount required to lift the latter a short distance for clearance after the latches 6 have been released. The raising of the door 2 cannot, however, commence at this stage since the closure pressure thereon by springs 5 of latches 6 has not yet been relaxed. This latter action is effected by further turning sequence control device 31 into position III to supply compressed air to the two pressure devices 30 for the latches. At the same time the further feed of compressed air to the thrust motor 18 is cut off by the device 31 without escape of air from this motor 18. When the release of pressure on the latches 6 commences, the compressed air in the thrust motor 18, e. g., of 20 atmospheres, further acts as in Fig. 4, on the motor 18 and the door-lifting means 17, 13 in such a manner that the pressure on the door through angle of lever 17 is raised by the amount which exceeds that, for example 5 atmospheres, necessary to bear the dead weight of the door. The door is thereby displaced to some extent longitudinally upwardly with its sealing flange 3 sliding over the sealing surface of the door frame 4.

The door now can be removed from the oven chamber by axially withdrawing the support 11 for the door-lifting means 17, 13 and be moved transversely by 7, or pivoted aside on 7 about axis 11².

Figure 3:
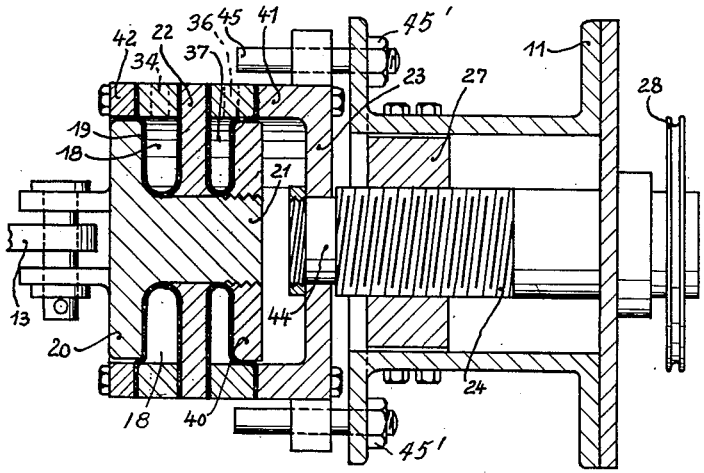

In Figure 2 of the drawings, the advancing and retracting motors 18 and 37 are illustrated in the pressure-relaxed condition. The supply of compressed air to thrust motor 18 produces a situation in the two motors 18 and 37 which is seen in Figure 3, wherein motor 18 is there under full pressure, for example 20 atmospheres, and has expanded, with complementary contraction of the retracting motor 37, by an amount corresponding to the travel of the door-lifting claws 13 and 14 into engagement with the door lugs 15.

Figure 4:
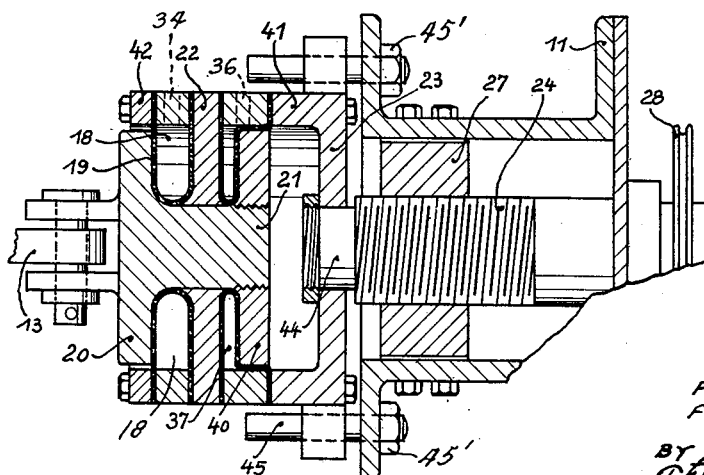

Figure 4 illustrates the further expansion of the thrust motor 18 and the further contraction of the retracting motor 37 which is produced after the compressed air has been allowed to pass to the pressure devices 30 of the latch mechanism by the after-expansion of the compressed air entrapped in the motor 18.

In reinserting the door, the sequence control device 31 is brought into position IV. As a result, compressed air is supplied to the retracting motor 37 in its Fig. 4 position so that this, as seen in Figure 3, contracts the thrust motor 18 with its entrapped compressed air to such an additional degree that the door-lifting claws 13 and 14 bring the door down into the starting seated position from which it was raised, that is to say the door is repositioned on the oven sole. The after-expansion is thereby again relieved, but the door-lifting claws 13 still remain in engagement with the lifting lugs 15. This prevents the door from dropping down before the latches 6 are engaged with their hooks on the oven battery.

To enable these features to be put into effect, the thrust motor 18 and the retracting motor 37 must be equally calibrated. Thus, for the same degree of compression of the air, the pressure surfaces of the two motors must be equal.

After the latches 6 have been swung into their hooks, the sequence control device 31 is then turned into position I, whereupon all the pressure-operated mechanisms are exhausted of air, so that the closure pressure of springs 5 is established and the door-lifting claws 13, 14 drop under their own weight away from the lugs 15. In the event that the door-lifting claws 13 and 14 fail to release under gravity, compressed air is supplied to the retracting motor 37 through a special conduit thereto from the sequence control device 31.

It is also to be understood that the invention contemplates the device 31 with five positions, and when turned to position V produce the result that only the thrust motor 18 and the pressure device 30 for the door-lifting claws will be contracted and the retracting motor 37 only slowly exhausted when the sequence control of the device is moved from position IV back to position I, for complete withdrawal of the door-lifting claws 13 and 14.

Figure 5:
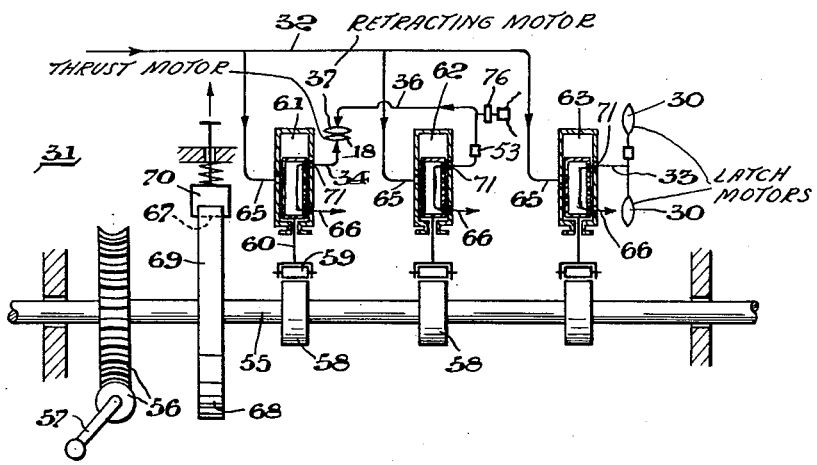

The form of sequence control device 31, which is diagrammatically illustrated in Figure 5 comprises a shaft 55 which is rotated from a hand wheel 57 through a worm and worm wheel gear 56. The transmission ratio used is such that, even when the wheel 57 is rotated rapidly, there is sufficient time for the various movements controlled by shaft 55 to take place. Arranged sequentially on the shaft 55 are cam discs 58 which are shaped in accordance with the movements to be controlled and the appropriate intervals between them, these discs acting through rollers 59 on rods 60 of valves or slides 61, 62 and 63. Compressed air is furnished to the casings of these valves through ports 65 from a header 32. Each of the valve casings is exhausted at 66.

In addition, a disc 69, Fig. 5, having notches 67 and 68 is secured on the shaft 55 to prevent inadvertent operation of the sequence control device 31. In the "exhaust" condition, a spring-urged tongue 70 engages in notch 67 so that the setting of the device can only be changed by moving this tongue 70 away from notch 67.

Figure 6:
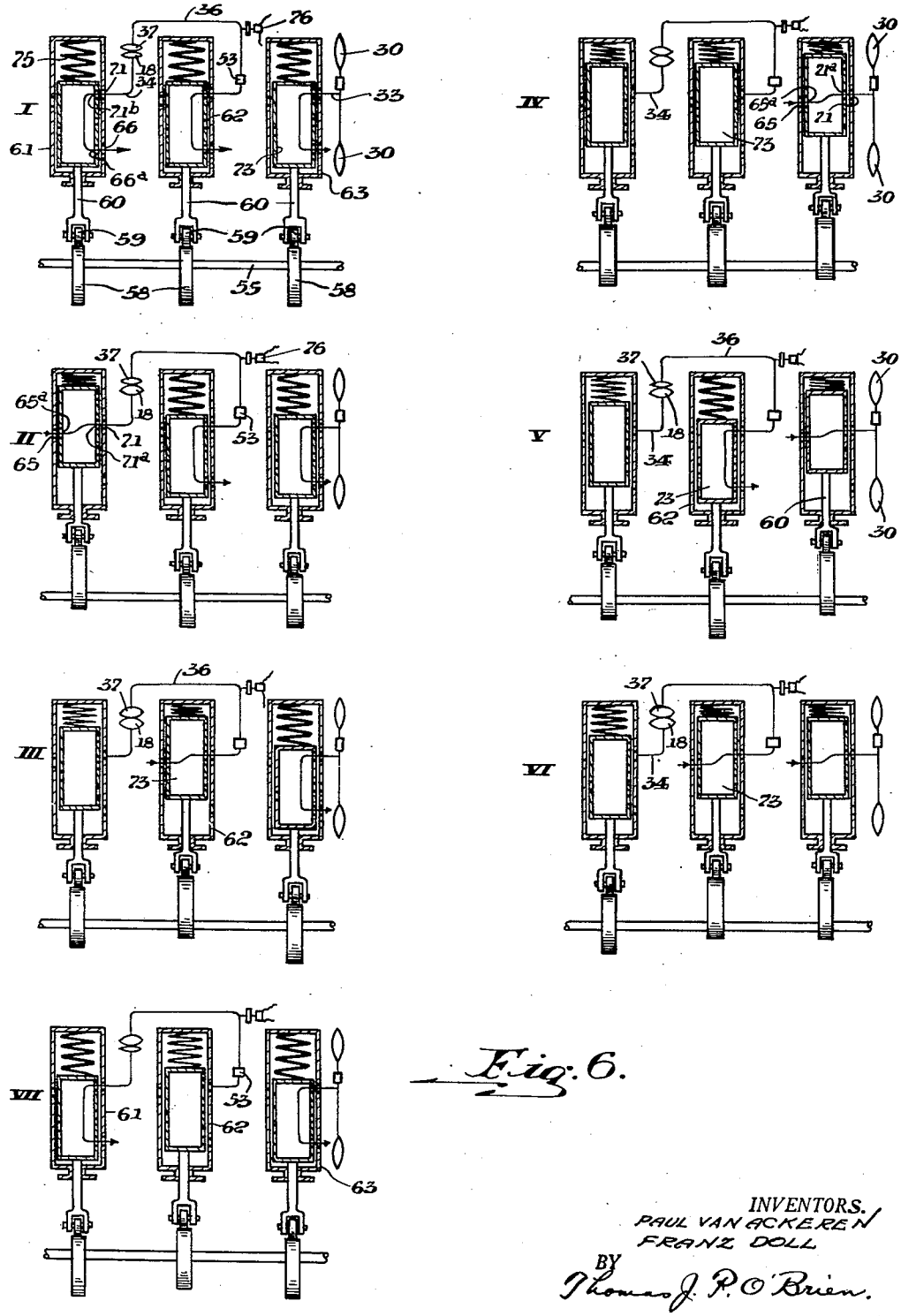

The valve casings 61, 62 and 63 have also ports 71, which respectively connect to compressed air outlet conduits 34, 36 and 32', 33, leading to the motors 18, 37, and 30, for the claws 13, 14, and for the latches 6. Piston cylinders 73, not indicated in Figure 5 but visible in Figure 6, are connected to piston rods 60 and are displaceably arranged in the valve casings, and each piston cylinder 73 has inlet ports 65a, 71a, and exhaust ports 71b and 66a arranged therein (see Figure 6). These ports are so related to the ports 65, 66 and 71 of the valves 61, 62 and 63 that when the port 65a of the cylindrical piston 73 registers with the port 65 of its valve casing, the port 71 of this casing is also in register with the port 71a of the piston. This positioning is, for example, achieved in the valve 61 when the device 31 is moved into position II, so that compressed air can pass to the corresponding motor.

The exhausting is effected when the port 71b of the piston is in register with port 71 of the valve casing, and port 66a of the piston 73 with port 66 of valve casing 61. With the valves in this position, compressed air can escape from the motor concerned to atmosphere through the port 66, 66a, as shown for example for all three valves in sequence position I.

The pistons 73 are held applied against the corresponding (Fig. 5) cam discs 58 through their rods 60 under the pressure of springs 75 in casings 61, 62, 63, Fig. 6.

The phases which occur when the door 2 is lifted, as indicated by the sequence stages described above as and marked I–IV in Figure 6, are as follows:

After the door-lifting mechanism 11 has been driven transversely to, and axially in front of, the door 2 into a position in which the door-lifting claws 13, 14 are disposed beneath the door lugs 15 ready for engagement therewith, and the latch spring pressure devices or motors 30 are located so that their couplings to the latches 6 are disposed directly in front of the closure latches 6 for the purpose of compressing the closure springs 5, the common drive shaft 55 is turned by means of the hand wheel 57 through the worm and worm wheel gear 56, after the locking device 67, 70 has been released. Before the common drive shaft 55 commences to turn the valves 61, 62 and 63 are in the "exhaust" position, as indicated in stage I of Figure 6, and motors 18, 37, 30, are in the position of motors 18, 37, as shown in Fig. 2.

When the shaft 55 is rotated, the cam disc 58 of valve 61 first provokes a movement of its piston 73 until the compressed air supplied at 65 is able to pass into conduit 34 through ports 65, 65a and 71 (stage II Fig. 6).

Compressed air can now flow through this conduit 34 to the thrust motor 18, Fig. 3, whereby the claws 13 are applied against the lugs 1 as in Fig. 1. At this stage, however, the door 2 cannot yet be lifted since the latches 6 are still under the pressure of the springs 55. By continued and uninterrupted rotation of the shaft 55, the piston 73 of valve 62 is brought into the position for releasing the compressed air (stage III Fig. 6), and this compressed air passes into the retracting motor 37. Simultaneously, or after a small further amount of rotation of shaft 55, the piston 73 of valve 61 is moved out of the position in which it allows the passage of compressed air to port 71a but insufficient to uncover port 66a, and the further supply of the air to motor 18 is consequently interrupted, although compressed air is still present in the conduit 34 and its motor 18. The air which is now passed through valve 62 to the retracting motor 37 causes the thrust motor 18 to remain stationary, so that during the compression of the closure springs 5, which takes place in the succeeding stage of the sequence operation, the compressed air in the thrust motor 18 is precluded from expanding to lift the door by the predetermined amount so long as compressed air is applied to the retracting motor 37, as shown in Fig. 3 and III in Fig. 6.

The conditions for compressed air supply to the latch operating pressure devices 30 for compressing the closure springs 5 is illustrated in the showing of stage IV in Figure 6. At this stage, compressed air is still applied to the retracting motor 37, Fig. 3, and the piston cylinder 73 of the valve 62 can commence to shut off the compressed air supply to motor 37. When further rotation of the shaft 55 takes place, the piston cylinder 73 of valve 62 has reached the "exhaust" position 66a (stage V Fig. 6), so that the compressed air passes to atmosphere from the retracting motor 37 through conduit 36 and valve 62 at 66a. The compressed air supply to the latch operating pressure devices 30 of the closure latches 6 is maintained as in V of Fig. 6, whilst compressed air is retained in the conduit 34 and the thrust motor 18, although further supplies of such air are cut off by their pistons 73, V of Fig. 6.

Along with the exhaustion of the retracting motor 37 and release of latches 6, the after-expansion of the compressed air in the thrust motor 18 can accordingly now take place in accordance with the air pressure, for example of 20 atmospheres, then existing in this motor. A relaxation of pressure from about 20 atmospheres to about 15 atmospheres takes place in the thrust motor 18 as the door is simultaneously lifted thereby. This lifting can be arranged to be effective when the pressure of the latches is relaxed since it is possible, by appropriate formation and adjustment of the associated cam disc, to select the time at which the exhaustion of the retracting motor takes place, and thus the beginning of the raising of the door, with a greater or lesser pressure of the door sealing means 3 against the sealing surface 4.

After latches 6 have been swung away from their hooks, the door 2 can be withdrawn and moved aside by means of 11 on 7, Fig. 1. In completing the sequence of operations for lifting the door, as described above, the locking disc 69 (Fig. 5) has made half a turn so that the spring-loaded tongue 70 engages automatically in notch 68 to prevent further turning of the shaft.

After the oven chamber 1 has been discharged of coke, the door 2 is again brought in front of the opening in this chamber 1. The closure latches 6 are now pivoted into engagement with the latch hooks and, after the locking tongue 70 has been released from 68 (Fig. 5), the sequence device 31 is further rotated. When this happens, the valve 62 first assumes a position in which compressed air passes to the retracting motor 37, as shown in stage VI in Figure 6. As a result, after-expanded compressed air present in the thrust motor 18 is again compressed and the door 2 is consequently lowered again and comes to rest on the sole of the oven chamber 1, the motors 30 meanwhile still being under spring compressing air pressure, as in VI of Fig. 6.

Further turning of the shaft 55 brings the valves 61, 62 and 63 into the "exhaust" position as is apparent from the drawing of stage VII. When this happens the closure springs 5 assume the position in which they exert a closure pressure on the latches 6 and door 2, and the door-lifting claws 13, 14 are relieved of air pressure by motor 18 so that they are capable of being lowered, but exhaust of air from motor 37 is delayed by the following described operation.

Figure 7:
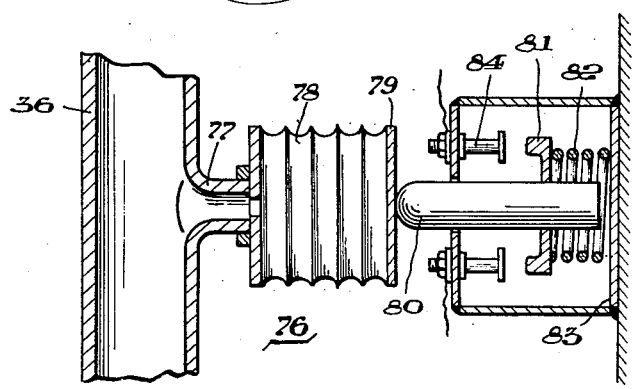
Figure 7 is a sectional view of a form of safety device which is used therewith.
Figure 12:
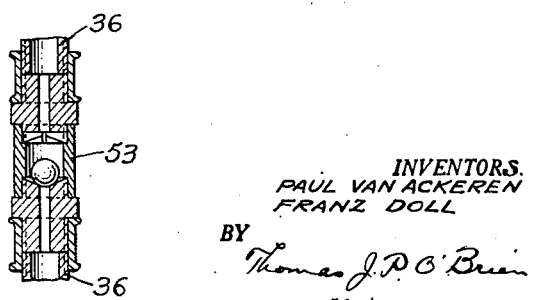
Figure 12 is a sectional view of the delay valve 53.

In order to insure that these claws are positively lowered, in accordance with a feature of the invention, a delay valve 53, Figs. 1, 7, and VII Fig. 6, is arranged in the compressed air conduit 36 leading to the retracting motor 37, and this valve 53 permits only a gradual escape of the compressed air from motor 37 to piston 73 of valve 62 in its position VII of Fig. 6. As a result of this slow relief of pressure in the motor 37, the pressure of the latter draws the door-lifting claws 13, 14 away so that they are positively moved from the lugs 15 in response to a sudden relief of pressure in the thrust motor 18.

A carriage traversal safety device 76, Fig. 1, illustrated in more detail in Figure 7, and II of Fig. 6, is arranged in the pressure direction behind (between) the delay valve 53 in conduit 36 for motor 37. This device 76 is connected with conduit 36 through a union 77, Fig. 7, and a resilient bellows or capsule 78 or the like, this capsule being so formed that it will expand axially under the influence of compressed air in line 36 and, when the latter is exhausted, will return to its initial position. The end wall 79 of the resilient housing 78 is pressed, when compression air expanded conditions obtain in the capsule, against a plunger 80 connected to a contact disc 81 which is acted on by a counter spring 82 supported in a casing 83. Arranged in this casing 83 are electrical contacts 84 which are connected to a phase of the electrical circuit of the driving motor or motors of the door-operating mechanism 11, 7, Fig. 1. So long as the capsule 78 is expanded under compressed air of line 36, the contact disc 81 is forced away from electrical contacts 84 as a result of the expansion of the capsule 78, and electric current supply to the pressure motors (not shown) of the door-operating mechanism 11, 7 is interrupted. When, however, the conduit 36 is relieved of pressure, the contact disc 81 bears against the electrical contacts 84. From this it follows that the door-operating mechanism 11, 7, Fig. 1, can only be withdrawn from the oven chamber 1 when the retracting motor 37 which performs the last of the operations referred to above, is relieved of air pressure and the door-lifting claws 13, 14 therefore completely removed from the lifting lugs 15.

In the preferred embodiment of the sequence device as illustrated in Figures 8 to 10, the sequence is effected by valves 86, 87, 88 and 89 arranged on the cover 90 of a casing 91 wherein valves 86, 88 and 89 correspond to valves 61, 62, 63, as in Fig. 6. The valves, which are held in the closed position by means of compression springs shown in Fig. 6, are controlled by valve rods 92 which correspond with rods 60 as in Fig. 6, and which are operated by adjustable screw bolts 93. These bolts 93 are adjustable in levers 94 and 94' which are pivotally mounted in hinged joints 95 on brackets 96 secured in the said casing. A long lever 94' acts on the valve 87, whilst valves 86, 88 and 89 are operated by short levers 94 carrying cam follower rollers 97 at their ends. The longer lever arm 94' also carries a cam follower roller 97' axially aligned with the rollers 97 of the shorter levers 94.

The cam follower rollers 97 and 97' ride on the edges of the cam discs 58 which correspond with cams 58 of Figs. 5 and 6, and are keyed on the shaft 55, this latter being mounted in bearings 103 in the casing 91. The shaft 55 also has keyed thereon a worm wheel 105 which is driven by a worm in turn operated by a hand wheel 107, which correspond with the elements 56, 57 of Fig. 5, the wheel 107' being arranged externally of the casing and having its shaft 108 passing through the bottom of this casing. The shaft 55 passes, at one end, through the wall of the casing and is rigidly connected at this end with a locking disc 107 mounted outside the casing.

The locking disc 107 and crank 111 correspond to the device 69, 70 of Fig. 5, and is provided with two opposite arcuate recesses 109 in which engage the circular surfaces of a disc 110 for the purpose of locking the shaft 55 against rotation. The disc 110 is connected to a crank 111 and has a cut-away 112 conforming with the circular peripheral surface of the locking disc 107 in such manner that, on rotation of the disc 110 to bring 112 into the zone of the peripheral surface of the locking disc 107, this disc then is capable of rotating within the surface 112 of the disc 110.

The valves 86, 88 and 89 are connected by ports 65 to the source of compressed air through the conduit 32, and the valve 86 through conduit 34 with the thrust motor 18, the valve 88 through the conduit 36 with the retracting motor 37, and the valve 89 through the conduit 33 with the two latch operating pressure devices 30. The valves 86, 88 and 89 are exhausted at 113, and the exhaust connection 113 of the valve 86 of the thrust motor 18 communicates with a special exhaust valve 87 through a conduit 114.

The various sequence procedures as illustrated are effected, by rotation of the hand wheel 107' after the crank 111 of the locking mechanism 110 has been pivoted into the position 118 (illustrated in dotted lines) against an abutment 100, Fig. 10. As a result of this rocking of the crank arm 111, the cut-away 112 of disc 110 is brought into the position indicated by dotted lines, i. e., into a position in which it does not intimately follow the peripheral surface of the locking disc 107. As a result the shaft 55 cannot be turned by the hand wheel 107 in the direction opposite to the arrow 117, because stop 109 prevents rotation of disc 110, as shown at 106, as will be evident. If, however, the shaft 55 is turned, as prescribed, in the direction of arrow 117, the edge 118 of the recess 109 in the locking disc 107 strikes against the cut-away 112 of the disc 110 in such fashion that, by turning the disc 110 it moves into the vicinity of the peripheral surface of the locking disc 107, and the crank 111 moves into the dotted position 115.

Consequently the cut-away 112 of disc 110 is slidably disposed relative to the peripheral surface of the locking disc 107, so that this disc can rotate with the shaft 55 and the cam discs 58 secured to the latter, and this rotation can continue uninterruptedly until the shaft, and with it the locking disc 107, have performed half a revolution to bring the recess 109 at the diametrically opposite side of the locking disc 107 into the vicinity of the disc 110. Thus the steps for lifting the door, as have already been described, are accomplished and the door can be removed after the latches 6 have been swung away from their hooks. At this time, the crank 111 drops down under gravity from the position 115 so that the position of the crank illustrated in Figure 7, i. e., the engagement of the disc 110 in the opposite recess 109, is re-established.

The unfastening of the locking means can be carried out in the same way after the door has been inserted.

The various operating steps can be read off a dial provided on the locking disc 107 by means of an indicator 120 secured to the casing 91.

As already stated, during the lifting of the door 2 the thrust motor 18 is under pressure, and it is only exhausted, after the unlatching pressure devices 30 have been exhausted, through the exhaust connection 121 and the relief valve 87 connected to the valve 86. The interior of casing 91 is accessible through a side opening 122 adapted to be closed by a cover 123 and screws 124.

The general operation of the invention with the preferred form of apparatus as in Figs. 8 to 10, may be readily understood by the following description in conjunction with Figure 11.

The door 2 is raised from an oven doorway 4 in the following fashion:

After spotting the carriage 7 with the door carrier 11 in front of an oven, the sequence control element 91 is operated as by hand, through manipulation of wheel 107' to turn shaft 55 to its first position at which the cam 58 and valve actuating means 97, 93, 92, actuate the valve 86, 88, 89 to their positions to connect their exhaust lines 113 with their supply lines 34, 36, 32', 33, and thus bring valve 89 into position in which the lines 32', 33, for the motors 30 for the latch actuating means 30', connect with the exhaust port 113 of valve 89, thereby insuring release of the door latches 6 from unlatching pressure at the start of operation.

Shaft 55 is then turned to a second position in which the cam 58 and valve actuating means 97, 93, 92, for the valve 86 actuates it to its position to connect line 34 for the thrust motor 18 with the port 65 to the source 32 of air under pressure, whereupon thrust motor 18 operates the door lifting levers 13, 14 into engagement with the door lifting lugs 15. The pressure in motor 18 from the source 32 is sufficient to provide the support for the dead weight of the door 2 as well as to provide the extra energy required to lift the door a short distance (against the pull of gravity) to enable it to clear the doorway 4 after the latches 6 are later released by operation of their motors 30. The raising of the door 2 cannot take place at this position of shaft 55 in the device 91, since the motors 30 are not actuated by operation of their valve 89 in this position of the shaft 55 of device 91.

For this latter action, the shaft 55 must be turned some more by wheel 107' a further degree of its circle to a third position. In this third position, the cam 58 and valve actuating means 97, 93, 92, for valve 89, actuates it to its position to connect lines 32', 33 with its port 65 leading to the source of compressed air 32, to supply air under pressure to the two fluid pressure operated motors 30. These motors, through the latch operating means 30', release the latches 6. At this position of shaft 55, the cam 58 and valve actuating means 97, 93, 92, for the valve 86 actuates that valve to cut the port 65 to the source of air pressure 32, from the line 34 leading to the thrust motor 18, without operating the valve 86 and line 34 to the position for exhaust through its exhaust port 113, thus preventing escape of air, that is still under the pressure of said source pressure, from line 34 and from motor 18.

When the motors 30 commence to release the pressure on the latches 6, the pressure of the air in the motor 18, which is about 20 atmospheres, further acts on the motor 18, and the door lifters 17, 13, so that through the angle of lever 17, the door 2 is raised by the amount which exceeds that pressure, for example 5 atmospheres, necessary to bear the dead weight of the door. This displaces the door slightly along its seat in the door frame 4, sliding the self sealing edges 3 along the sealing surfaces on frame 4, and cleaning the same. The door 2 can now be retracted by the carrier 11, and be shifted aside by moving carriage 7, or pivoted aside by rotating carrier 11 on carriage 7.

In this situation, the thrust motor 18 and the retracting motor 37 assume the positions shown in Figs. 3 and 4, wherein as shown in Fig. 3, motor 18 is under full pressure, for example 20 atmospheres, and has expanded, with complementary contraction of the retracting motor 37, by an amount corresponding to the travel of the door lifting claws 13, 14 into engagement with the door lugs 15, and as shown in Fig. 4 thrust motor 18 has expanded further and retracting motor 37 has retracted further, which latter condition is produced, after the compressed air has passed to the motors 30 for the latches 6, by the after expansion of the compressed air entrapped in the motor 18.

In reseating the door back into its oven, the shaft 55 of the device 91 is brought to a fourth angular position at which the cam 58 and valve actuating means 97, 93, 92 for the valve 88 actuates it to its position to connect the port 65 to the source of pressure 32 with the line 36, for supply of fluid pressure to the retracting motor 37 while this motor is in the position shown in Fig. 4. As a result compressed air is supplied thereto from line 32 so that motor 37 expands and in so doing contracts motor 18 with its entrapped compressed air to a degree that the door lifting claws 13, 14, bring the door down into the starting seated position in the oven door frame 4.

The aforesaid after expansion is relieved but the door lifting claws 13, 14 still remain in engagement with the lifting lugs 15. This prevents the door from dropping down before the latches 6 are engaged with their hooks on the coke oven battery, with the motors 30 still under pressure and holding the latches 6 in released position, through the means 30'. During this time the latches 6 are turned into position for engaging the latch hooks when the motors later are exhausted to release the latches for locking action.

After this, the shaft 55 of the sequence control element 91 is again moved a further increment angularly by operation of wheel 107', the cams 58 are thereby turned into the aforesaid first position at which all the valves 86, 88, and 89 connect their exhaust ports 113 with the lines to their motors, whereupon the closure pressures of the latch springs 5 are established again on the latch bars 6 and their door hooks and the door, and the door lifting claws 13, 14 drop down under their own weight away from the lugs 15 on the door.

In the modified operation of the system with the preferred embodiment of Figs. 7 to 10, at the end of the movement to the second position of shaft 55 of device 91, cam 58 and valve actuating means 97, 93, 92, for the valve 88 actuates it to connect its port 65 with its line 36 and compressed air passes to the retracting motor 37. Simultaneously the cam 58 for valve 89 acts to close the line 34 to the port 65 of valve 89. The air in the retracting motor 37 acts on the air pressure in the thrust motor 18, equalizing the same, and the motor 18 is precluded from expanding and thus lifting the door a predetermined amount, so long as the motors 18 and 37 are in the situation of Fig. 3 and III of Fig. 6.

When the shaft 55 of the sequence control element 91 is moved to the third position to supply air to the retracting motor 37, the cam for the valve 88 for the retracting motor 37 and the cam 58 for valve 86 cut off their port 65, trapping the air under pressure in line 34 to the thrust motor so that during the next stage when the springs for the latches 6 are compressed, the motor 18 cannot expand because of the air under pressure in motor 37.

After the movement of the cam shaft 55 to the fourth position and before its return to the first position while the cams are in position relative to each other so that the port 65 for line 36 to valve 88 cuts off the air line 32, entrapping air in retracting motor 37 as well as in motor 18, the valve 89 for the latch motors 30 is set by its cam 58 to open ports 65 for air flow to motors 30. Movement to a fifth position of the cam shaft 55, sets cam 58 for valve 88 in position to exhaust retracting motor 37 through line 36 and its exhaust port 113. At this time latches 6 are now released from the air pressure in their motors 30, and motor 18 is free to expand under its air pressure, since motor 37 is exhausting its air. This after expansion raises the door 2 to unseat it, the air in motor 18 then relaxing in pressure from 20 to 15 atmospheres, as a result of the work in raising the door 2. The door 2 can now be retracted from the oven by means of the carrier 11, and pivoted around its axis on carriage 7, and then shifted aside by moving carriage 11 on track 9 to one side of the oven.

In replacing the door, the carriage 7 is moved back in front of the oven, carrier 11 is then advanced and the latches 6 rotated in place. Then valve 89 is operated by its cam 58, through operation of the shaft 55 of the sequence control element 91, to a sixth angular position as shown at VI in Figure 6, at which time the line 36 is opened to its exhaust port 113 as shown at VI in Fig. 6, to exhaust air pressure from the retracting motor 37. The after expanded compressed air then is recompressed by the weight of the door at the elevated level, as it descends by gravity, since the thrust motor 37 is exhausted and ring 40 now is free to move to the left, allowing like movement of ring 20.

Movement of shaft 55 of the sequence device 91 to a seventh angular position Fig. 6, brings the cams 58 of the three valves 86, 88, 89 back to the aforesaid position I in which all of the lines 32', 33, 34 and 36 connect with their exhaust ports 113. This frees the latches 6 for relatching and door hooks 13, 14, descend from the lugs 15. In order to insure that the hooks or claws 13, 14 are positively lowered, in accord with the further delay feature of the invention the delay valve 53, of any known type, such as one of the type illustrated in Franz Doll's copending application Serial No. 284,281, filed April 25, 1952, is interposed in line 36. This permits only a gradual escape of air to the exhaust port 113, as shown in position VII of Fig. 6. The exhaust of pressure from motor 18 while pressure still exists in motor 37 results in ring 40 exerting a sudden shift of ring 20 and claws 13, 14, accelerating their dropping out from engagement with lugs 15.

The device 76 prevents premature movement of carriage 7 so long as pressure is "on" in the retracting motor 37.

The exhaust port 113 for the valve 86 for the thrust motor 18 exhausts through a conduit 114 to atmosphere at 121, by way of a special exhaust valve 87 operable by a separate cam 97', which affords with valve 86, a double seal against exhaust of air pressure from the thrust motor 18 when it is under the load of the great weight of the door 2.

It is also to be understood that the apparatus according to this invention is also capable of use with doors in which the pressure of the latches is produced other than by closure springs.

What we claim is:

1. Door lifting apparatus for doors of horizontal coking chamber ovens, comprising: a carriage for travel from oven to oven; a door carrier mounted on said carriage; a first means on said carrier including a fluid pressure thrust motor for effecting release of door closure latching means on a said door; a second means on said carrier including a fluid pressure thrust motor independent of the first means for grasping and lifting said door; separate fluid pressure conduit lines to the thrust motors of said first and second means; a common source of compressible fluid pressure, and exhaust means, for the lines to said thrust motors; and a common sequence control valve means for controlling the flow to and from the separate lines of said thrust motors, for effecting operation of said motors in a predetermined sequence, said sequence control means comprising a rotary shaft and a separate valve for each fluid pressure line to a said motor for connecting said lines to said common source of fluid pressure and to said exhaust means, said valves being operatively associated with said shaft to be operated thereby in different angular positions around its axis for successive flow of fluid pressure to the motors of said first means and said second means with operation first of the valve for flow from the source to the line to the thrust motor of the second means for grasping and lifting a door, and thereafter, on further angular operation of the rotary shaft, to cut off both the source to, and the exhaust from, that line and operate the valve to connect the source to the line to the thrust motor of said first means to release the latches of a door, and in which the thrust motor of said second means is one that is operable, after actuation of the thrust motor of the first means to release the latches of a door, to respond to the pressure of fluid previously admitted thereto to expand and thus effect the lifting of the door as the latches release the door.

2. Door lifting apparatus for doors of horizontal coking chamber ovens, comprising: a carriage for travel from oven to oven; a door carrier mounted on said carriage; a first means on said carrier including a fluid pressure thrust motor for effecting release of door closure latching means on a said door; a second means on said carrier independent of the first means for grasping and lifting said door, said second means including a thrust motor and a retracting motor coaxially coupled to the thrust motor; a separate fluid pressure conduit line to the thrust motor of the first means, and separate fluid pressure lines to the thrust motor and the retracting motor of the second means; a common source of fluid pressure for the lines to said motors; exhaust means for exhaust of fluid pressure from the lines of said thrust motors; a common sequence-control valve means for controlling the flow to and from the separate lines of said thrust motors for effecting their operation in a predetermined sequence, said sequence control means comprising a rotary shaft and a separate valve mechanism for each pressure line to a said motor, for connecting said lines to said common source of fluid pressure and to said exhaust means, said valve mechanisms being operatively associated with said rotary shaft to be operated thereby in different angular positions of said shaft around its axis, the valve mechanisms for the line to the thrust motor of said second means being set to operate at an angle of the rotary shaft, to first operate for flow of pressure from the source to its thrust motor and then to cut off the source from the line, the valve for the line to the thrust motor of said first means being set to operate at a later angle for flow of pressure medium from said source to its thrust motor while the line to the thrust motor for the second means is so cut off, and the valve for the line to the retracting motor of said second means being set to operate at a still later angle for flow of pressure medium from said source to the retracting motor while the valve for the thrust motor of said second means is still set to cut off the source to its line and the valve for the thrust motor of said first means is still set for flow of pressure medium to its motor, for reseating the door while still in grasping relation with said second means.

3. Door lifting apparatus as claimed in claim 2 and in which the thrust and retracting motors of said second means are of equal output.

4. Door lifting apparatus as claimed in claim 2, and in which the thrust and retracting motors of said second means are mounted on a common shaft that is adjustable relative to the doors of different oven-chambers, and in which said shaft is provided with manually operable means for manually manipulating it to operate the second means for lifting the doors manually.

5. Door-lifting apparatus as claimed in claim 2 and which includes a relief-delaying valve in the fluid pressure conduit line to the retracting motor that is coupled to the thrust motor for said second means.

6. Door lifting apparatus as claimed in claim 5, and which includes a safety device in the fluid pressure conduit line to the retracting motor said device being between said motor and the delay valve, said safety device being operable under the pressure in the line to the retracting motor to interrupt a line from a source of power for retracting the door carrier fom door sealing position.

7. Door lifting apparatus as claimed in claim 6, and in which the safety device comprises a bellows under pressure of the fluid pressure conduit line to the retracting motor of said second means and a make and break device operable by the bellows to control the flow of power for retracting the door carrier.

8. Door lifting apparatus for doors of horizontal coking chamber ovens, comprising: a carriage for travel from oven to oven; a door carrier mounted on said carriage; a first means on said carrier including a fluid pressure thrust motor for effecting release of door closure latching means on a said door; a second means on said carrier including a fluid pressure thrust motor independent of the first means for grasping and lifting said door; separate fluid pressure conduit lines to the thrust motors of said first and second means; a common source of fluid pressure for the lines to said thrust motors; exhaust means for exhaust of fluid pressure from the lines of said thrust motors; and a common sequence control valve means for controlling the flow to and from the separate lines of said thrust motors, for effecting operation of said motors in a predetermined sequence, said sequence control means comprising a rotary shaft and a separate valve for each fluid pressure line to a said motor for connecting said lines to said common source of fluid pressure and to said exhaust means, said valves being operatively associated with said shaft to be operated thereby in different angular positions around its axis for successive flow of fluid pressure to the motors of said first means and said second means with operation of a separate valve for each fluid pressure line to a said motor for connecting said lines to said common source of fluid pressure and to said exhaust means, said rotary control shaft carrying sequentially disposed cam discs, intermediate means operable by the discs to actuate the valves for opening and closing the flow paths to and from the conduit lines relative to the common source of fluid pressure and to the exhaust means, a locking disc rigidly secured to the rotary control shaft and provided at two diametrically opposite parts of its periphery with semicircular locking recesses, a second disc rotatable by means of a crank and positioned to have a perimetrical portion rotated into engagement in diametrically opposite recesses of said locking disc, said second disc also having a recess at its perimeter conforming to the circumference of the perimeter of the locking disc and adapted, on rotation of the crank, to be brought into confronting relation with the recesses in the locking disc on the control shaft to coincide with the peripheral edge of the locking disc in the unlocked condition of the parts.

9. Door lifting apparatus as claimed in claim 8 and in which the recess in the second disc is disposed thereon, relative to the axis of rotation of the second disc, to enter in interlocking engagement with each recess of the locking disc on the control shaft when the crank hangs vertically downward and, when the crank is pivoted more than 180°, to allow turning of the locking disc in one predetermined direction only, while locking the disc against rotation in the opposite direction and, upon rotation of the locking disc into a position of nearly 180°, to allow the crank to drop into the locking position wherein the recess portion in the second disc enters into interlocking relation in the zone of the second recess portion in the locking disc, to prevent further rotation to 180°, and allow of further rotation only in the reverse direction of rotation of the rotary control shaft.

References Cited in the file of this patent
UNITED STATES PATENTS

| 2,179,608 | Berg et al. | Nov. 14, 1939 |
| 2,190,297 | Salkvist | Feb. 13, 1940 |
| 2,576,126 | Lavely | Nov. 27, 1951 |
| 2,588,060 | Tweit | Mar. 4, 1952 |
| 2,639,023 | Goodrich | May 19, 1953 |